United States Patent [19]

Dore

[11] 4,155,903
[45] May 22, 1979

[54] ASYMMETRICAL 1:2 COBALT COMPLEXES OF CERTAIN SUBSTITUTED PHENYLAZONAPHTHALENES

[75] Inventor: Jacky Dore, Basel, Switzerland

[73] Assignee: Sandoz Ltd., Basel, Switzerland

[21] Appl. No.: 681,966

[22] Filed: Apr. 30, 1976

[30] Foreign Application Priority Data

May 6, 1975 [CH] Switzerland .......................... 5817/75

[51] Int. Cl.² ...................... C09B 45/20; C09B 45/48
[52] U.S. Cl. ......................... 260/145 A; 260/145 B; 260/146 R; 260/151; 260/152; 260/156; 260/196; 260/197; 260/198; 260/199
[58] Field of Search ....................... 260/145 A, 145 B

[56] References Cited

U.S. PATENT DOCUMENTS

| | | | |
|---|---|---|---|
| 2,906,746 | 9/1959 | Brassel et al. | 260/145 A |
| 3,005,813 | 10/1961 | Brassel et al. | 260/145 A |

FOREIGN PATENT DOCUMENTS

| | | | |
|---|---|---|---|
| 1115426 | 4/1956 | France | 260/145 A |
| 476812 | 9/1969 | Switzerland | 260/145 A |
| 781286 | 8/1957 | United Kingdom | 260/145 A |
| 1371926 | 10/1974 | United Kingdom | 260/151 |

Primary Examiner—Charles F. Warren
Attorney, Agent, or Firm—Gerald D. Sharkin; Richard E. Vila; Melvyn M. Kassenoff

[57] ABSTRACT

Disclosed are homogeneous complexes of the formula

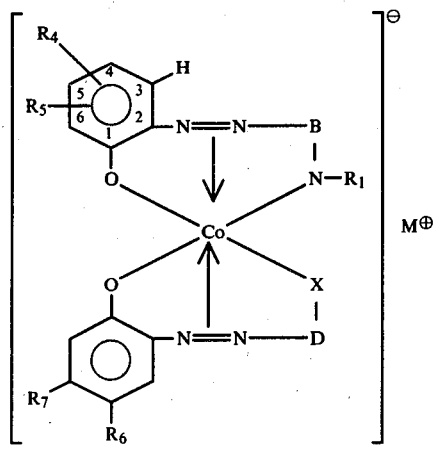

wherein $R_1$ is hydrogen, alkyl, phenyl or substituted phenyl, B is

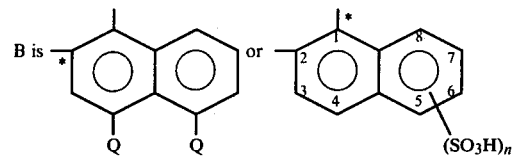

wherein one Q is hydrogen and the other is sulfo, and n is 0 or 1 (the sulfo group being in the 5- or 6-position when n is 1), $R_4$ is hydrogen, alkyl, alkoxy, chloro, bromo or nitro,
$R_5$ is hydrogen, alkyl, alkoxy, chloro, bromo, nitro or sulfo,
with the proviso that when one of $R_4$ and $R_5$ is hydrogen, the other is other than hydrogen and is in the 4- or 5-position and when both are other than hydrogen, one is in the 4-position and the other is in the 5- or 6-position, one of $R_6$ and $R_7$ is hydrogen, chloro or nitro and the other is hydrogen, sulfamoyl or substituted sulfamoyl, and —X—D— is

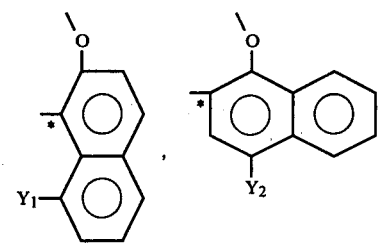

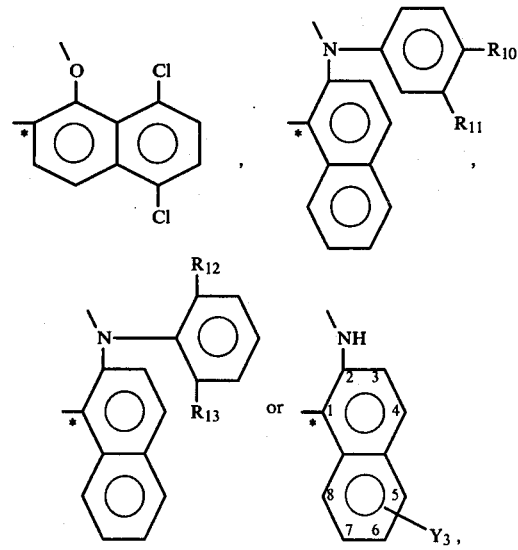

wherein one of $R_{10}$ and $R_{11}$ is hydrogen and the other is hydrogen, chloro, alkyl, alkoxy or trifluoromethyl,
$R_{12}$ is hydrogen or methyl,
$R_{13}$ is methyl, chloro or bromo, with the proviso that $R_{12}$ is hydrogen when $R_{13}$ is chloro or bromo, $Y_1$ is hydrogen or acylamino, $Y_2$ is hydrogen, alkyl, alkoxy, chloro or bromo, $Y_3$ is hydrogen or 5- or 6-sulfamoyl, alkylsulfamoyl or hydroxyalkylsulfamoyl, and $M^{\oplus}$ is hydrogen or a non-chromophoric cation, wherein the asterisks indicate the carbon atom attached to the azo group, with the proviso that the complex contains a single sulfamoyl or substituted sulfamoyl group and a single sulfo group which is in salt form, and mixtures of such complexes. The complexes and mixtures are useful for dyeing and printing nitrogen-containing organic substrates, for example, polyamides such as wool, silk and nylon, polyurethanes and leather.

24 Claims, No Drawings

ASYMMETRICAL 1:2 COBALT COMPLEXES OF CERTAIN SUBSTITUTED PHENYLAZONAPHTHALENES

The present invention relates to homogeneous asymmetric 1:2 cobalt complexes and mixtures of such complexes.

More particularly, the invention provides homogenous asymmetric 1:2 cobalt complexes of formula I,

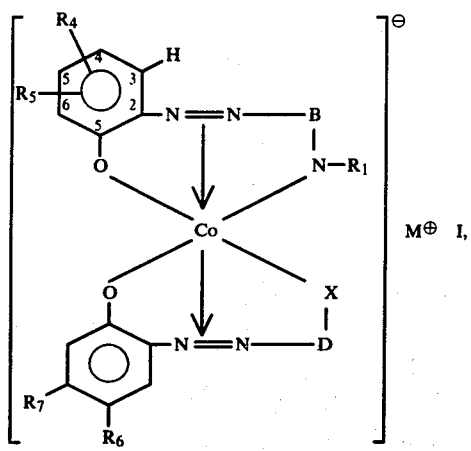

in which $R_1$ is hydrogen, $(C_{1-4})$ alkyl or a group of the formula

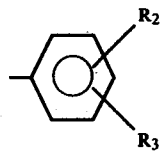

in which $R_2$ is hydrogen, chlorine, bromine, methyl, methoxy or trifluoromethyl, and $R_3$ is hydrogen, methyl, methoxy or —$SO_3H$, B is a group of the formula

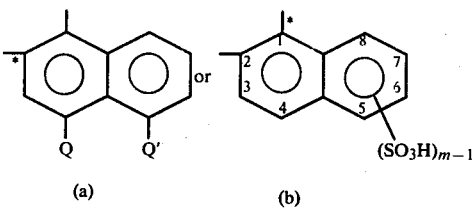

wherein one of Q and Q' is $SO_3H$ and the other is hydrogen, and m is 1 or 2 and when m is 2 the sulpho group is in the 5- or 6-position, $R_4$ is hydrogen, $(C_{1-4})$alkyl, $(C_{1-4})$alkoxy, chlorine, bromine or nitro, $R_5$ has one of the significances of $R_4$ or is —$SO_3H$, with the proviso that when one of $R_4$ and $R_5$ is hydrogen and the other is other than hydrogen, the substituent is in the 4- or 5-position and where both $R_4$ and $R_5$ are other than hydrogen the substituents are in the 4,5- or 4,6-positions, one of $R_6$ and $R_7$ is hydrogen, chloro or nitro and the other is hydrogen or —$SO_2NR_8R_9$, either $R_8$ is hydrogen or unsubstituted or substituted $(C_{1-4})$alkyl, $R_9$ is hydrogen or unsubstituted or substituted $(C_{1-4})$alkyl, $(C_{5-7})$cycloalkyl or phenyl, or $R_8$ and $R_9$, together with the nitrogen atom to which they are bound, form a non-aromatic 5- or 6-membered heterocyclic ring which contains no further or a further hetero atom, —X—D— is a divalent radical of formula (c), (d), (e), (f), (g) or (h),

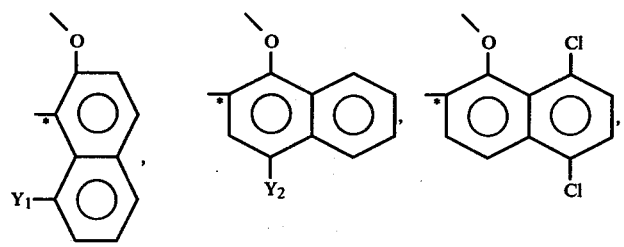

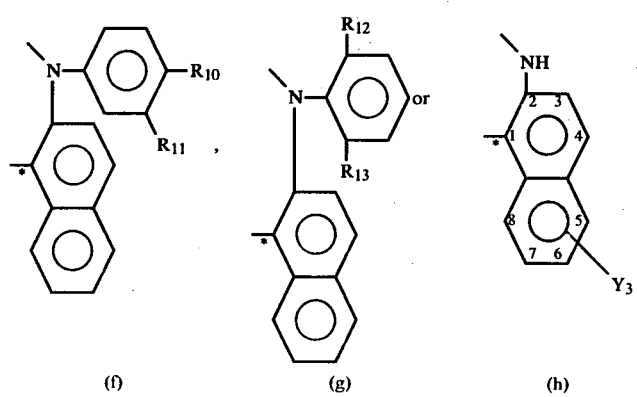

wherein one of $R_{10}$ and $R_{11}$ is hydrogen, chlorine, $(C_{1-2})$alkyl, $(C_{1-2})$alkoxy or trifluoromethyl and the other is hydrogen, $R_{12}$ is hydrogen or methyl, $R_{13}$ is methyl, chlorine or bromine, with the proviso that when $R_{13}$ is chlorine or bromine, $R_{12}$ is hydrogen, $Y_1$ is hydrogen, —NHCOR$_{14}$, —NHCOOR$_{15}$ or —NHSO$_2$Z, $R_{14}$ and $R_{15}$ are unsubstituted or substituted $(C_{1-4})$alkyl or phenyl, Z is $(C_{1-4})$alkyl, unsubstituted or substituted phenyl or —NR$_{16}$R$_{17}$, $R_{16}$ is hydrogen, methyl or ethyl, $R_{17}$ is methyl or ethyl, $Y_2$ is hydrogen, $(C_{1-2})$alkyl, $(C_{1-2})$alkoxy, chlorine or bromine, $Y_3$ is hydrogen or —SO$_2$NHR$_{18}$, any such —SO$_2$NHR$_{18}$ group being in the 5- or 6-position, $R_{18}$ is hydrogen, $(C_{1-4})$alkyl or $(C_{2-4})$hydroxyalkyl, $M^\oplus$ is hydrogen or a non-chromophoric cation, and the asterisks indicate the carbon atom attached to the azo group, with the provisos that the molecule contains a single sulpho group and a single sulphonamide group, which sulpho group is in salt form, and that the molecule is free from

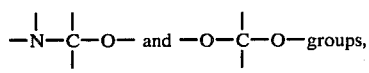

and mixtures of such homogeneous 1:2 cobalt complexes.

The sulpho group is preferably bound to the B or $R_1$ nucleus, more preferably to the $R_1$ nucleus.

Where $R_1$ is alkyl, preferably such alkyl is methyl or ethyl. When $R_1$ is

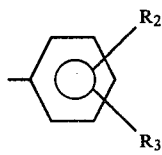

then $R_2$ is preferably $R_2'$, where $R_2'$ is hydrogen or chlorine, especially hydrogen; $R_3$ is preferably $R_3'$, where $R_3'$ is hydrogen or —SO$_3$H, more preferably $R_3''$, where $R_3''$ is —SO$_3$H in the 3- or 4- position.

Preferably, $R_1$ is $R_1'$, where $R_1'$ is hydrogen or

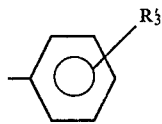

in which $R_3'$ is as defined above; more preferably, $R_1$ is $R_1''$, where $R_1''$ is

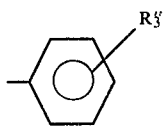

where $R_3''$ is as defined above.

Preferably, B is a group of formula (b) as given above. More preferably B is a group of formula (b) in which m is 1.

Any alkyl or alkoxy radicals as significances for $R_4$ and/or $R_5$ are preferably methyl or methoxy radicals.

Preferably, $R_4$ is $R_4'$, where $R_4'$ is hydrogen, chlorine or nitro. More preferably, $R_4$ is $R_4''$, where $R_4''$ is chlorine or nitro.

Preferably, $R_5$ is $R_5'$, where $R_5'$ is hydrogen, chlorine, nitro or —SO$_3$H. More preferably, $R_5$ is $R_5''$, where $R_5''$ is hydrogen, chlorine or nitro, with nitro being especially preferred.

When both $R_4$ and $R_5$ have a significance other than hydrogen, they are preferably in the 4,6-positions.

Where one of $R_6$ and $R_7$ is —SO$_2$NR$_8$R$_9$, any alkyl group as $R_8$ and $R_9$ is straight-chain or branched and is unsubstituted or monosubstituted by halogen, such as chlorine or bromine, hydroxy, cyano, phenyl or $(C_{1-4})$, preferably $(C_{1-2})$, alkoxy. Preferred substituents are hydroxy, methoxy and ethoxy, with hydroxy being especially preferred. Where one of $R_8$ and $R_9$ is unsubstituted alkyl, preferably such alkyl is $(C_{1-3})$, more preferably methyl, ethyl or isopropyl.

Where $R_9$ is unsubstituted or substituted cycloalkyl, such cycloalkyl preferably contains 5 or 6 carbon atoms, with cyclohexyl groups being especially preferred. Substituted cycloalkyl groups as $R_9$ are preferably mono-, di- or trimethyl-substituted cycloalkyls.

Where $R_9$ signifies phenyl, such phenyl is preferably unsubstituted. Where $R_9$ is substituted phenyl the phenyl ring is preferably substituted by up to 3 substituents selected from halogen, such as fluorine, chlorine and bromine, nitro, $(C_{1-4})$alkyl and $(C_{1-4})$alkoxy. Preferred substituents are chlorine, nitro, methyl, methoxy and ethoxy. Preferably, when substituted the ring is monosubstituted by chlorine, nitro, methyl, methoxy or ethoxy.

Where $R_8$ and $R_9$, together with the nitrogen atom, form a heterocyclic ring, preferably they form a pyrrolidine, piperidine or morpholine ring.

Preferably, $R_8$ is $R_8'$, where $R_8'$ is hydrogen, $(C_{1-3})$alkyl or $(C_{2-3})$hydroxyalkyl. More preferably $R_8$ is hydrogen.

Preferably, $R_9$ is $R_9'$, where $R_9'$ is hydrogen, $(C_{1-3})$alkyl, $(C_{2-3})$hydroxyalkyl, methoxy- or ethoxy-$(C_{2-4})$, preferably $(C_{2-3})$, alkyl, unsubstituted phenyl, phenyl monosubstituted by chlorine, nitro, methyl, methoxy or ethoxy or phenyl substituted by two methyl, methoxy or ethoxy groups. More preferably $R_9$ is $R_9''$, where $R_9''$ is hydrogen, methyl, ethyl, isopropyl, β-hydroxyethyl, 2-hydroxy-n-propyl, —(CH$_2$)$_3$—OCH$_3$ or unsubstituted phenyl. Even more preferably, $R_9$ is $R_9'''$, where $R_9'''$ is hydrogen, methyl, —(CH$_2$)$_3$—OCH$_3$ or unsubstituted phenyl, with hydrogen and —(CH$_2$)$_3$—OCH$_3$ being especially preferred.

Preferably, one of $R_6$ and $R_7$ is —SO$_2$NHR$_9'$, more preferably —SO$_2$NHR$_9''$, most preferably —SO$_2$NHR$_9'''$ and the other is hydrogen. The complexes where $R_6$ is —SO$_2$NH$_2$ or —SO$_2$NH(CH$_2$)$_3$OCH$_3$ and $R_7$ is hydrogen are especially preferred.

When one of $R_{10}$ and $R_{11}$ is alkoxy, such alkoxy is preferably methoxy.

Preferably, $R_{10}$ is $R_{10}'$, where $R_{10}'$ is hydrogen, chlorine, methyl, ethyl or methoxy and $R_{11}$ is hydrogen. More preferably both $R_{10}$ and $R_{11}$ are hydrogen.

$R_{13}$ is preferably methyl.

Any alkyl group for $R_{14}$ and $R_{15}$ may be straight chain or branched. The preferred unsubstituted alkyls are methyl and ethyl. Any substituted alkyl as $R_{14}$ and $R_{15}$ is preferably substituted by the substituents given above for the substituted alkyl radicals as $R_8$ and $R_9$. Any substituted phenyl is preferably substituted by the substituents given above for substituted phenyl radicals as $R_9$. Preferably, any phenyl radical as $R_{14}$ and $R_{15}$ is unsubstituted.

Preferably, $R_{14}$ and $R_{14}'$, where $R_{14}'$ is methyl, ethyl or phenyl and $R_{15}$ is $R_{15}'$, where $R_{15}'$ has one of the significances of $R_{14}'$.

Any alkyl as Z preferably contains 1 or 2 carbon atoms, with methyl being especially preferred. Any substituted phenyl as Z preferably bears the substituents given above for substituted phenyl as $R_9$. When Z is $-NR_{16}R_{17}$, preferably each of $R_{16}$ and $R_{17}$ is methyl.

Preferably, Z is $Z_1$, where $Z_1$ is alkyl or $-NR_{16}R_{17}$, with $-N(CH_3)_2$ being especially preferred. Preferably, $Y_1$ is $Y_1'$, where $Y_1'$, is hydrogen, $-NHCOR_{14}'$, $-NHCOOR_{15}'$ or $-NHSO_2Z_1$, where $R_{14}'$, $R_{15}'$ and $Z_1$ are as defined above. More preferably $Y_1''$ is hydrogen, $-NHCOR_{14}'$ or $-NHSO_2-N(CH_3)_2$, with hydrogen being especially preferred.

$Y_2$ is preferably $Y_2'$ where $Y_2'$ is methyl or methoxy. Where $R_{18}$ is alkyl, such alkyl preferably contains 1 or 2 carbon atoms, with methyl being especially preferred. When $R_{18}$ is hydroxyalkyl such hydroxyalkyl preferably contains 2 or 3 carbon atoms and is preferably a β-hydroxyalkyl.

Preferably, $R_{18}$ is $R_{18}'$, where $R_{18}'$ is hydrogen, methyl or β-hydroxy($C_{2-3}$)alkyl.

When $Y_3$ is $-SO_2NHR_{18}$ in the 5- or 6-position such $-SO_2NHR_{18}$ is preferably $-SO_2NHR_{18}'$ where $R_{18}'$ is as defined above and is preferably in the 6-position.

One set of complexes of formula I are those where $-X-D-$ is a radical of formula (c); another set where $-X-D-$ is a radical of formula (d); another set where $-X-D-$ is a radical of formula (e); another set where $-X-D-$ is a radical of formula (f); another set where $-X-D-$ is a radical of formula (g); and another set where $-X-D-$ is a radical of formula (h).

The group $-X-D-$ is preferably a radical of formula (c), (d), (e), (f) or (h) as defined above; more preferably it is a group of formula (c) or (f).

As examples of non-chromophoric cations as $M^\oplus$ can be given, alkali metal cations, such as lithium, sodium or potassium, sodium being the preferred alkali metal cation; $N^\oplus R_4$ wherein each R is, independently, hydrogen, ($C_{1-3}$)alkyl or hydroxy($C_{2-3}$)alkyl with the proviso that when one or more of the symbols R signifies hydroxyalkyl at least one R signifies hydrogen. Examples of such alkylammonium ions are mono-, di-, tri- and tetra-methylammonium, triethylammonium and mono-, di- and tri-ethylammonium.

However, quaternized amines which reduce the water-solubility of the 1:2 cobalt complexes so that they are only soluble in the presence of organic solvents are also suitable cations. Examples of suitable amines are N-ethyl-N-hexylamine, cyclohexylamine, N,N-dicyclohexylamine and cyclic amines such as morpholine.

The salt form of the $-SO_3H$ group may correspond to any of the above mentioned cations for $M^\oplus$. The salt form cation may be the same as or different from $M^\oplus$. Among the preferred homogeneous 1:2 cobalt complexes of formula I and mixtures of complexes are those wherein $R_1$ is $R_1'$, $R_4$ is $R_4'$, $R_5$ is $R_5'$, one of $R_6$ and $R_7$ is $-SO_2NHR_9'$ and the other is hydrogen, each of $R_{14}$ and $R_{15}$ is $C_{1-4}$alkyl; $C_{1-4}$alkyl monosubstituted by halo, hydroxy, cyano, phenyl or $C_{1-4}$alkoxy; phenyl or phenyl monosubstituted by chloro, nitro, methyl, methoxy or ethoxy or disubstituted by methyl, methoxy or ethoxy and B is a radical of formula (b).

Preferred complexes of formula I are those of formula Ia,

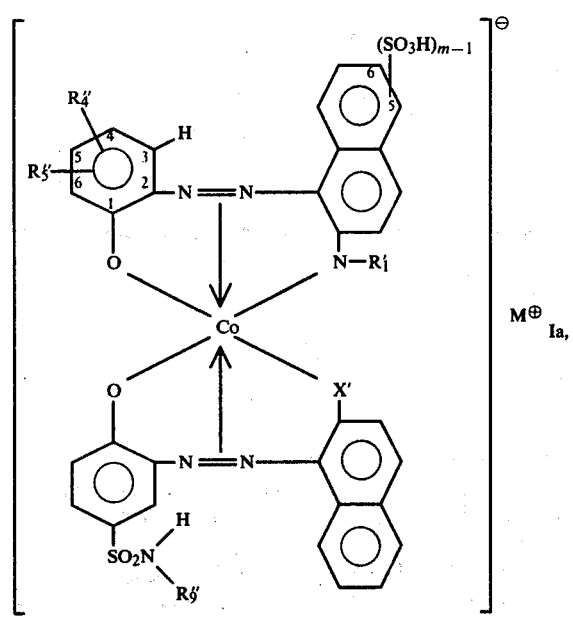

in which $R_1'$, $R_4''$, $R_5''$, m, $R_9''$ and $M^\oplus$ are as defined above, and $-X'-$ is $-O-$ or

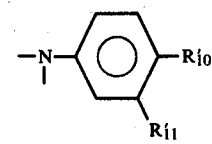

in which $R_{10}'$ is as defined above and $R_{11}'$ is hydrogen, the sulpho group being in the 5-or 6-position when m is 2.

Even more preferred compounds of formula I are those of formula Ib,

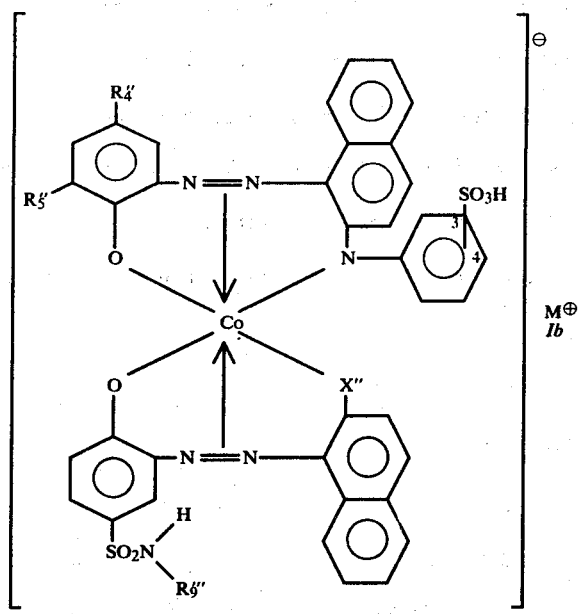

in which $R_4''$, $R_5''$, $R_9'''$ and $M^\oplus$ are as defined above, $-X-''$ is $-O-$ or

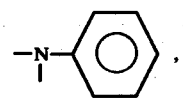

and the sulpho group is in the 3- or 4-position.

Especially preferred are the complexes of formula Ib in which $R_4''$ is nitro, more preferably both $R_4''$ and $R_5''$ are nitro.

The preferred mixtures of the 1:2 complexes of formula I are mixtures of at least one compound of formula I in which the group $-X-D-$ is a group of formula (f), (g) or (h) with a compound of formula I in which $-X-D-$ is a group of formula (c), (d) or (e). Preferably 30 to 70% of the compound or compounds having a group $-X-D-$ of formula (f), (g) or (h) is employed; more preferably, the mixtures are 1:1 mixtures.

The invention also provides a process for the production of homogeneous asymmetric complexes of formula I, or mixtures of such asymmetric complexes, comprising (a) reacting a 1:1 complex of formula II or a mixture thereof,

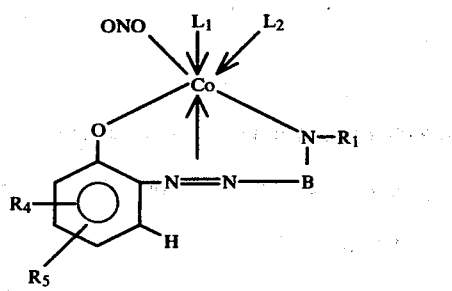

in which $L_1$ and $L_2$ are both monodentate ligands, and $R_1$, $R_4$, $R_5$ and B are as defined above,
with a compound of formula III, or a mixture thereof,

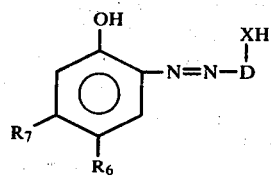

in which $R_6$, $R_7$ and $-X-D-$ are as defined above, or (b) reacting a corresponding nitrite containing cobalt complex of the compound of formula III or a mixture thereof, where $-D-X-$ is a group of formula (f), (g) or (h) with a compound of formula IV,

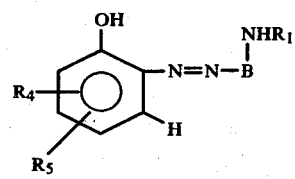

in which $R_1$, $R_4$, $R_5$ and B are as defined above, or a mixture thereof.

Preferably, the reactants are employed in stoichiometric amounts. The ligands $L_1$ and $L_2$ may, for example, be colourless inorganic or organic molecules which have an oxygen-containing or nitrogen-containing group with electron donating properties, in particular water molecules. The reaction is conveniently conducted in aqueous and/or organic solvent medium. As examples of suitable organic solvents may be given aliphatic carboxylic acid amides, such as formamide or an alkylated derivative thereof; glycols such as ethyleneglycol, di- or tri-ethyleneglycol or ether derivatives thereof. The reaction is suitably conducted in a neutral or alkaline medium and is completed after all the 1:1 cobalt complex has been reacted. The 1:2 cobalt complex obtained may be salted out in conventional manner an after washing in a concentrated salt solution may be collected and dried. When mixtures of starting materials are used, the reaction is conducted in similar manner.

The obtained 1:2 cobalt complexes are homogeneous asymmetric complexes. By homogeneous is meant that the obtained asymmetric 1:2 complexes contain less than 10% by the possible symmetric complexes.

The starting material of formula II may, for example, be prepared by reacting a compound of formula IV, as defined above, with a cobalt-donating compound, preferably employing, at least one mole of the cobalt-donating compound per mole of the compound of formula IV. The cobalt-donating compound is suitably a cobalt (II) salt. The reaction is suitably conducted in the presence of an inorganic nitrite, preferably in a ratio of 2 to 6 moles of the nitrite per gram atom of cobalt. The metallization may be conducted in conventional manner.

Depending on the reaction and isolation conditions (e.g. addition of base to obtain an alkaline pH or the salt used to salt-out the product) a complex of formula I is obtained in which $M^\oplus$ is preferably an alkali metal cation such as lithium, sodium or potassium or an ammonium ion and in which the cation $M^\oplus$ is the same or different as the cation of the sulpho group in the salt form. When a weak acid is used, a complex is obtained in which $M^\oplus$ is hydrogen. The hydrogen ion may be replaced by an alkali metal cation or quaternary ammonium ion by the addition of alkali metal hydroxides or organic amines. Preferably, $M^\oplus$ is other than hydrogen.

The complexes of formula I and their mixtures are useful for dyeing and printing nitrogen-containing organic substrates. Examples of suitable substrates are those which consist of or comprise natural and synthetic polyamides such as wool, silk or nylon, polyurethane fibres and leather. Dyeings with reddish- to greenish-grey shades are, in most cases, obtained. By employing mixtures of the complexes of formula I dyeings with neutral grey shades may be obtained.

The dyeings obtained exhibit notable light- and wet-fastness properties. Furthermore, they are fast to rubbing and show notable resistance to carbonization, ironing, wool chlorination and the action of acids and alkalis. They build-up from a neutral dyeing medium on polyamide fibres, the build-up being tone-in-tone due to their homogeneous asymmetric character. In printing pastes they build-up well on all types of polyamides.

The complexes of formula I which are well-soluble in water, i.e. those which have cations other than the aforementioned quaternary amines such as N-ethyl-N-hexylamine, cyclohexylamine, N,N-dicyclohexylamine or cyclic amines in quaternary form, are useful for dyeing metals, especially anodized aluminum.

The complexes of formula I which are soluble in organic solvents and are scarcely or totally insoluble in water, i.e. those having quaternary amine cations as referred to above, may be used in the preparation of printing lacquers and bal-point pen inks.

The following Examples further serve to illustrate the invention. In the Examples the parts are by weight and the temperatures are in degrees Centigrade.

EXAMPLE 1

The 1:1 cobalt complex obtained from 51 parts of the monoazo dyestuff 2-amino-1-hydroxy-4,6-dinitrobenzene → 2phenylaminonaphthalene-4'-sulphonic acid is stirred into 800 parts of water at 50° together with 34 parts of the dyestuff obtained by coupling diazotised 2-amino-1-hydroxybenzene-4-sulphonic acid amide with 2-hydroxynaphthalene. The pH is adjusted to 12 by the addition of caustic soda and stirring is continued for some hours at 40°–50° until the 1:1 cobalt complex has completely disappeared. The chromatograph of the asymmetric 1:2 cobalt complex thus obtained should no longer show metal-free dyestuff or only slight traces thereof. The dyestuff solution is filtered and the product is salted out by the addition of sodium chloride. Finally, the dyestuff is filtered, washed with a 10% sodium chloride solution and dried; it corresponds to the formula

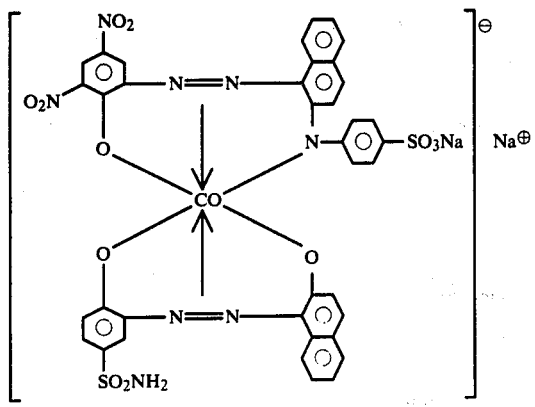

The dyestuff is well soluble in water and dyes natural and synthetic polyamide fibres such as wool and nylon is reddish-grey shades. The dyeing has good all-round wet fastness and fastness to rubbing and light.

The 1:1 cobalt complex used as the initial material may be produced as follows:

28 parts of cobalt-(II)-sulphate.7H$_2$O and 21 parts of sodium nitrite and dissolved in a beaker containing 500 parts of water and 100 parts of dimethyl formamide, then 51 parts of the monoazo dyestuff 2-amino-4,6-dinitro-1-hydroxybenzene → 2-phenylaminonaphthalene-4'-sulphonic acid are added with stirring. During and after the addition of the monoazo dyestuff the pH is set at 5.0 – 5.5 with dilute hydrochloric acid and it is kept in this range for about 24 hours, until the initial dyestuff has been completely converted into the 1:1 cobalt complex. During metallization, the temperature is maintained at 20°to 30°. The 1:1 cobalt complex is precipitated by salting out, filtered off and washed with a 5% sodium chloride solution until the filtrate is free of cobalt. The 1:1 cobalt complex may be used as such to form the assymetrical 1:2 cobalt complex.

EXAMPLE 2

The 1:1 cobalt complex produced as described in Example 1, 21 parts of the dyestuff obtained by acid coupling of diazotised 2-amino-1-hydroxybenzene-4-sulphonic acid amide with 2-phenylaminonaphthalene and 17 parts of the dyestuff obtained by alkaline coupling of diazotised 2-amino-1-hydroxybenzene-4-sulphonic acid amide with 2-hydroxynaphthalene are stirred into 800 parts of water at 20°. Subsequently, 250 parts of a 30% sodium hydroxide solution are added and stirring continued at 20° until the 1:1 cobalt complex has been completely converted into 2 asymmetrical 1:2 cobalt complexes, at which the two unmetallized dyestuffs should no longer be detectable, or only in slight traces. The mixture of the two asymmetrical complexes is precipitated by adding sodium chloride, it is filtered off, washed with 10% sodium chloride solution and dried.

The dried dyestuff is well soluble in water and dyes natural and synthetic polyamide fibres such as wool and nylon in grey shades. The dyeings have good fastness to light and good all-round wet fastness. Furthermore, the dyeings are resistant to acid and alkali and are fast to rubbing. Leather dyeings obtained with the above mixture have good light fastness.

Further dyestuff complexes are given in the following Table and have the structure indicated; they may be produced in analogy with the procedure described in Example 1 and are in sodium salt form. On polyamides they yield dyeings which have similar properties to those obtained with the dyestuffs of Examples 1 and 2, such dyeings have the following shades:

grey: Examples 5, 7, 8, 10, 13 to 15, 17 to 26, 28 to 33, 35, 39, 41, 42, 49 and 50
reddish-grey: Examples 6 and 27
bluish-grey: Examples 34, 46 to 48 and 51
olive-gray: Example 45
greenish-grey: Examples 3, 4, 11, 12, 36 to 38, 40, 43 and 44
green: Example 9
dark brown: Example 16

| Example No. | Compound of formula IV | Compound(s) of formula III |
|---|---|---|
| 3 | 2-amino-1-hydroxy-4,6-dinitrobenzene → 2-phenylaminonaphthalene-4'-sulphonic acid | 2-amino-1-hydroxybenzene-4-sulphonic acid amide → 2-phenylaminonaphthalene |
| 4 | " | 2-amino-1-hydroxybenzene-4-sulphonic acid amide → 2-(3'-chlorophenylamino)naphthalene |
| 5 | " | { 2-amino-1-hydroxybenzene-4-sulphonic acid amide → 2-phenylaminonaphthalene + 2-amino-1-hydroxybenzene-4-sulfonic acid N-3'-methoxypropylamide → 2-hydroxynaphthalene |
| 6 | " | 2-amino-1-hydroxybenzene-4-N-(3'-methoxypropyl)sulphonic acid amide → 2-hydroxynaphthalene |
| 7 | " | 2-amino-1-hydroxybenzene-4-sulphonic acid amide → 8-acetylamino-2-hydroxynaphthalene |
| 8 | " | 2-amino-1-hydroxybenzene-4-sulphonic acid amide → 8-(N,N-dimethylsulphamoyl)amino-2-hydroxynaphthalene |
| 9 | 2-amino-1-hydroxy-4,6-dinitrobenzene → 2-aminonaphthalene-6-sulphonic acid | 2-amino-1-hydroxybenzene-4-sulphonic acid amide → 2-aminonaphthalene |
| 10 | 2-amino-1-hydroxy-4-nitrobenzene-6-sulphonic acid → 2-phenylaminonaphthalene | " |
| 11 | " | 2-amino-1-hydroxybenzene-4-N-phenylsulphonic acid amide → 2-phenylaminonaphthalene |
| 12 | " | 2-amino-1-hydroxybenzene-4-sulphonic acid amide → 2-phenylaminonaphthalene |
| 13 | 2-amino-1-hydroxybenzene-4-sulphonic acid → 2-phenylaminonaphthalene | " |
| 14 | 2-amino-1-hydroxybenzene → 2-aminonaphthalene-6-sulphonic acid | 2-amino-1-hydroxybenzene-4-sulphonic acid amide → 2-phenylaminonaphthalene |
| 15 | 2-amino-1-hydroxy-4-nitrobenzene → 2-aminonaphthalene-6-sulphonic acid | 2-amino-1-hydroxybenzene-4-sulphonic acid amide → 2-phenylaminonaphthalene |
| 16 | " | 2-amino-1-hydroxybenzene-4-sulfonic acid N-3'-methoxypropylamide → 2-hydroxynaphthalene |
| 17 | " | 2-amino-1-hydroxybenzene-4-N-phenylsulphonic acid amide → 2-phenylaminonaphthalene |
| 18 | 2-amino-1-hydroxy-4,6-dinitrobenzene → 2-aminonaphthalene-6-sulphonic acid | { 2-amino-1-hydroxybenzene-4-sulphonic acid amide → 2-phenylaminonaphthalene + 2-amino-1-hydroxybenzene-4-sulfonic acid N-3'-methoxypropylamide → 2-hydroxynaphthalene |
| 19 | 2-amino-1-hydroxy-4,6-dinitrobenzene → 1-aminonaphthalene-4-sulphonic acid | " |
| 20 | 2-amino-1-hydroxy-4-nitrobenzene → 1-aminonaphthalene-4-sulphonic acid | 2-amino-1-hydroxybenzene-4-sulphonic acid amide → 2-phenylaminonaphthalene |
| 21 | 2-amino-1-hydroxy-4-nitrobenzene → 1-amino-2nd position naphthalene-5-sulphonic acid | " |
| 22 | 2-amino-1-hydroxy-4,6-dinitrobenzene → 2-phenylaminonaphthalene-4'-sulphonic acid | 2-amino-1-hydroxybenzene-5-sulphonic acid amide → 2-hydroxynaphthalene |
| 23 | " | 2-amino-1-hydroxybenzene-5-N-sulfonic acid methylamide → 2-hydroxynaphthalene |
| 24 | " | 2-amino-4-chloro-1-hydroxybenzene 5-sulphonic acid amide → 2- |

-continued

| Example No. | Compound of formula IV | Compound(s) of formula III |
|---|---|---|
| 25 | 2-amino-1-hydroxy-4,6-dinitro-benzene → 2-phenylaminonaphthalene-4'-sulphonic acid | hydroxynaphthalene 2-amino-1-hydroxy-5-nitrobenzene-4-sulphonic acid amide → 2-hydroxynaphthalene |
| 26 | " | 2-amino-1-hydroxybenzene-5-sulfonic acid-N-methylamide → 1-hydroxy-5,8-dichloronaphthalene |
| 27 | " | 2-amino-1-hydroxybenzene-4-sulfonic acid N-isopropylamide → 2-(2',6'-dimethylphenyl-amino)naphthalene |
| 28 | " | 2-amino-1-hydroxybenzene-4-sulphonic acid amide → 1-hydroxy-4-methylnaphthalene |
| 29 | " | 2-amino-1-hydroxybenzene-4-sulphonic acid amide → 1-hydroxy-4-methoxynaphthalene |
| 30 | " | 2-amino-1-hydroxybenzene-4-sulphonic acid amide → 1-hydroxy-5,8-dichloronaphthalene |
| 31 | 2-amino-1-hydroxy-4-nitro-benzene → 2-aminonaphthalene-6-sulphonic acid | " |
| 32 | " | 2-amino-1-hydroxybenzene-4-sulphonic acid amide → 1-hydroxy-4-methylnaphthalene |
| 33 | " | 2-amino-1-hydroxybenzene-4-sulphonic acid amide → 1-hydroxy-4-methoxynaphthalene |
| 34 | 2-amino-4-chloro-1-hydroxy-benzene-6-sulphonic acid → 2-aminonaphthalene | 2-amino-1-hydroxybenzene → 2-amino-naphthalene-6-sulfonic acid N-2'-hydroxy-propylamide |
| 35 | 2-amino-1-hydroxy-6-methyl-4-nitrobenzene → 2-aminonaphthalene-5-sulphonic acid | 2-amino-1-hydroxybenzene-4-sulphonic acid amide → 8-benzoyl-amino-2-hydroxynaphthalene |
| 36 | 2-amino-1-hydroxy-4-methyl-6-nitrobenzene → 2-aminonaphthalene-6-sulphonic acid | 2-amino-1-hydroxybenzene-4-sulfonic acid N,N-dimethylamide → 2-(4'-methoxyphenylamino)naphthalene |
| 37 | 2-amino-1-hydroxy-4-methoxybenzene → 1-amino-2nd position naphthalene-5-sulphonic acid | 2-amino-1-hydroxybenzene-4-sulfonic acid N-2'methoxyethyl-amide → 2-phenylaminonaphthalene |
| 38 | 2-amino-1-hydroxy-4,6-dinitro-benzene → 1-aminonaphthalene-4-sulphonic acid | 2-amino-1-hydroxybenzene-4-sulphonic acid amide → 2-(4'-chlorophenyl-amino)naphthalene |
| 39 | 2-amino-1-hydroxy-4,6-dinitro-benzene → 2-(3'-chloro-phenylamino)naphthalene-4'-sulphonic acid | 2-amino-1-hydroxybenzene-5-sulphonic acid morpholine → 2-hydroxynaphthalene |
| 40 | 2-amino-1-hydroxy-4-methyl-benzene-6-sulphonic acid → 2-(4'-methylphenylamino)naphthalene | 2-amino-1-hydroxy-4-nitrobenzene → 2-aminonaphthalene-6-sulfonic acid N-methylamide |
| 41 | 2-amino-1-hydroxy-6-nitro-4-propylbenzene → 2-aminonaphthalene-6-sulphonic acid | 2-amino-1-hydroxybenzene-4-sulphonic acid amide → 8-ethoxy-carbonylamino-2-hydroxynaphthalene |
| 42 | 2-amino-4,6-dichloro-1-hydroxy-benzene → 2-aminonaphthalene-6-sulphonic acid | 2-amino-1-hydroxybenzene-4-sulfonic acid N,N-diethylamide → 8-acetylamino-2-hydroxynaphthalene |
| 43 | 2-amino-4-chloro-1-hydroxy-6-nitrobenzene → 2-aminonaphthalene-5-sulphonic acid | 2-amino-1-hydroxybenzene-4-sulfonic acid N-2'-hydroxyethylamide → 2-phenylaminonaphthalene |
| 44 | 2-amino-6-chloro-1-hydroxy-4-nitrobenzene → 2-aminonaphthalene-5-sulphonic acid | 2-amino-1-hydroxybenzene-4-sulfonic acid N-2'-hydroxypropyl-amide → 2-phenylaminonaphthalene |
| 45 | 2-amino-1-hydroxy-6-nitro-benzene-4-sulphonic acid → 2-ethylaminonaphthalene | 2-amino-1-hydroxybenzene-5-sulfonic acid N-methylamide → 2-(2'-methylphenylamino)naphthalene |
| 46 | 2-amino-1-hydroxy-5-nitro-benzene → 2-aminonaphthalene-6-sulphonic acid | 2-amino-1-hydroxybenzene-4-sulphonic acid morpholine → 2-(4'-ethylphenylamino)naphthalene |
| 47 | 2-amino-1-hydroxy-4,6-dinitrobenzene → 2-aminonaphthalene-5-sulphonic acid | 2-amino-1-hydroxybenzene-4-sulphonic acid amide → 2-phenyl-aminonaphthalene |
| 48 | " | 2-amino-1-hydroxybenzene-4-sulphonic acid amide → 8-acetyl- |

-continued

| Example No. | Compound of formula IV | Compound(s) of formula III |
|---|---|---|
| 49 | 2-amino-1-hydroxy-4-nitro-benzene → 2-aminonaphthalene-5-sulphonic acid | amino-2-hydroxynaphthalene 2-amino-1-hydroxybenzene-4-sulphonic acid amide → 8-acetyl-amino-2-hydroxynaphthalene |
| 50 | " | 2-amino-1-hydroxybenzene-4-sulphonic acid amide → 2-phenylaminonaphthalene |
| 51 | 2-amino-1-hydroxy-4,6-dinitrobenzene → 1-amino-2nd position naphthalene-5-sulphonic acid | " |
| 52 | 2-amino-1-hydroxy-4-nitrobenzene → 2-phenylaminonaphthalene-6-sulfonic acid | " |

APPLICATION EXAMPLE A 0.05 g of the dyestuff obtained in accordance with Example 1 is dissolved in 300 parts of water, 0.2 g o ammonium sulphate being added thereto. Subsequently, the steeped material (5 g of wool gaberdine or 5 g of nylon-satin) is entered into the bath which is heated over the course of 30 minutes to boiling temperature. The water which evaporated is replaced and dyeing is completed at boiling temperature for a further 30 minutes. The material is then rinsed. After drying, a reddish-grey dyeing is obtained which has good light and wet fastness.

The dyestuffs of Examples 2 to 51 may be employed in analogous manner.

APPLICATION EXAMPLE B

Polyamides are printed with a printing paste of the following formulation:
30 parts of the dyestuff of Example 3,
50 parts urea,
50 parts dissolving agent for example, thiodiethyleneglycol
300 parts water,
500 parts suitable thickening agent for example, based on a locust bean gum,
60 parts acid acceptor for example, ammonium tartrate, and
60 parts thiourea.

The printed textile goods are steamed for 40 minutes at 102° (saturated steam), then rinsed with cold water, washed for 5 minutes at 60° with a dilute solution of a conventional detergent and then rinsed again. A bluish-olive printe with good wet and light fastnesses is obtained.

The dyestuffs of Examples 1, 2 and 4 to 51 may be used in analogous manner to print polyamides.

What is claimed is:
1. A homogenous complex of the formula

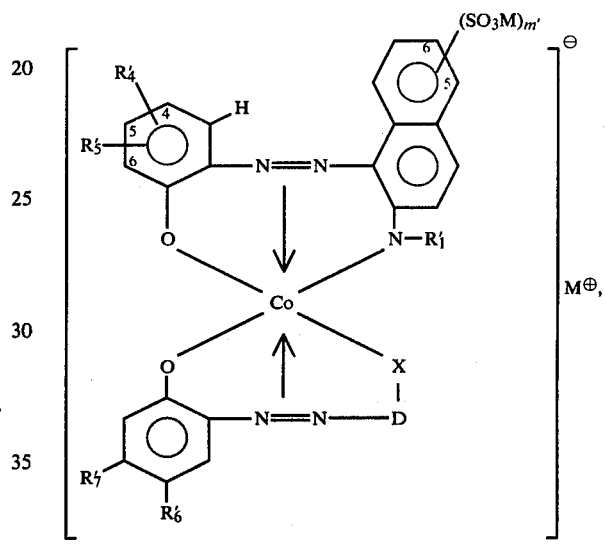

or a mixture of such complexes,
wherein $R'_1$ is hydrogen or

wherein $R'_3$ is hydrogen or $-SO_3M$,
$R'_4$ is hydrogen, chloro or nitro,
$R'_5$ is hydrogen, chloro, nitro or $-SO_3M$,
with the proviso that when only one of $R'_4$ and $R'_5$ is hydrogen, the one that is other than hydrogen is in the 4- or 5-position, and when both $R'_4$ and $R'_5$ are other than hydrogen, they are in the 4,5- or 4,6-positions,
one of $R'_6$ and $R'_7$ is $-SO_2NHR'_9$ and the other is hydrogen,
wherein $R'_9$ is hydrogen; $C_{1-3}$alkyl; $C_{2-3}$hydroxyalkyl; methoxy($C_{2-4}$alkyl); ethoxy($C_{2-4}$alkyl); phenyl; phenyl monosubstituted by chloro, nitro, methyl, methoxy or ethoxy or phenyl disubstituted by methyl, methoxy or ethoxy, $$\begin{matrix} \\ X \\ | \end{matrix}$$
—D is -continued

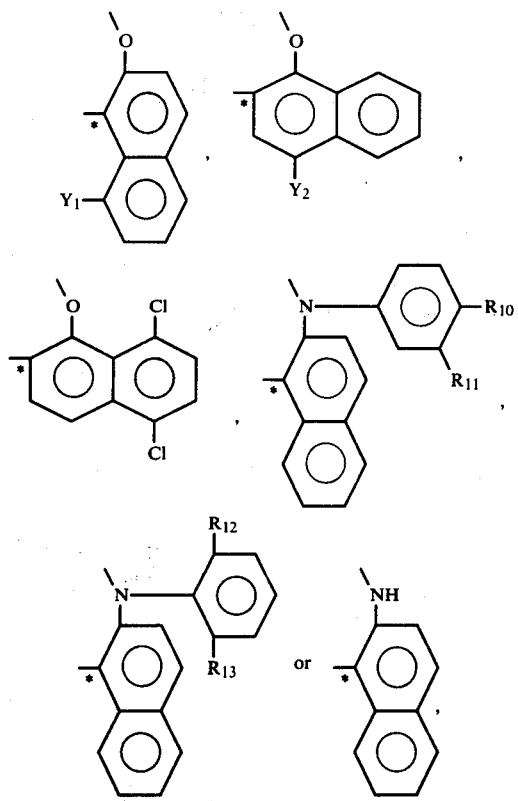

wherein one of $R_{10}$ and $R_{11}$ is hydrogen, chloro, $C_{1-2}$alkyl, $C_{1-2}$alkoxy or trifluoromethyl and the other is hydrogen, $R_{12}$ is hydrogen or methyl, $R_{13}$ is methyl, chloro or bromo, with the proviso that when $R_{13}$ is chloro or bromo, $R_{12}$ is hydrogen, $Y_1$ is hydrogen, —NHCOR$_{14}$, —NHCOOR$_{15}$ or —NHSO$_2$NR$_{16}$R$_{17}$, wherein each of $R_{14}$ and $R_{15}$ is $C_{1-4}$alkyl; $C_{1-4}$alkyl mono-substituted by halo, hydroxy, cyano, phenyl or $C_{1-4}$alkoxy; phenyl; phenyl monosubstituted by chloro, nitro, methyl, methoxy or ethoxy or phenyl disubstituted by methyl, methoxy or ethoxy, $R_{16}$ is hydrogen, methyl or ethyl, and $R_{17}$ is methyl or ethyl, and $Y_2$ is hydrogen, $C_{1-2}$alkyl, $C_{1-2}$alkoxy, chloro or bromo, wherein the asterisk indicates the carbon atom attached to the —N=N— radical, M' is 0 or 1, with the proviso that when m' is 1 the —SO$_3$M group is in the 5- or 6-position, M$^\oplus$ is hydrogen or a non-chromophoric cation, and M is a non-chromophoric cation, with the provisos that (i) the complex contains a single —SO$_3$M group, and (ii) the complex is free of

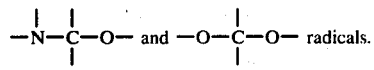

2. A homogeneous complex according to claim 1, or a mixture of such complexes, wherein M$^\oplus$ is hydrogen, lithium, sodium, potassium or $^\oplus$NR$_4$, wherein each R is independently hydrogen, $C_{1-3}$alkyl or $C_{2-3}$hyroxyalkyl, with the proviso that at least one R is hydrogen when any R is $C_{2-3}$hydroxyalkyl, and M is lithium, sodium, potassium or $^\oplus$NR$_4$, wherein each R is independently hydrogen, $C_{1-3}$alkyl or $C_{2-3}$hydroxyalkyl, with the proviso that at least one R is hydrogen when any R is $C_{2-3}$hydroxyalkyl.

3. A homogeneous complex according to claim 2.

4. A homogeneous complex according to claim 2, or a mixture of such complexes, wherein M$^\oplus$ is sodium, and M is sodium.

5. A homogeneous complex according to claim 1 having the formula

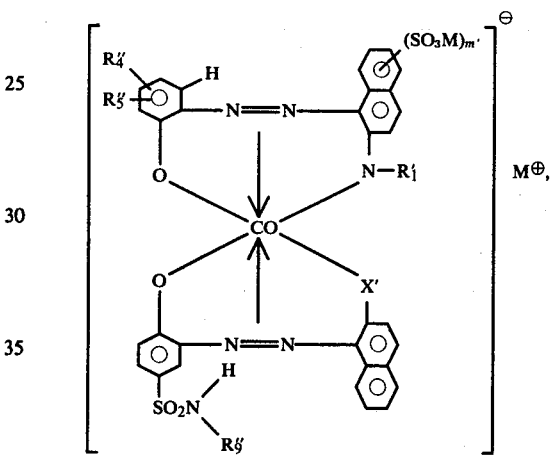

or a mixture of such complexes, wherein R'$_1$ is hydrogen or

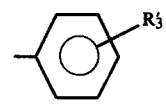

wherein R'$_3$ is hydrogen or —SO$_3$M,

R"$_4$ is chloro or nitro,

R"$_5$ is hydrogen, chloro or nitro, with the proviso that when R"$_5$ is hydrogen, R"$_4$ is in the 4- or 5-position, and when R"$_5$ is chloro or nitro, R"$_4$ and R"$_5$ are in the 4,5- or 4,6-positions, R"$_9$ is hydrogen, methyl, ethyl, isopropyl, 2-hydroxyethyl, 2-hydroxy-n-propyl, 3-methoxypropyl or phenyl, —X'— is —O— or

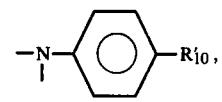

wherein R'$_{10}$ is hydrogen, chloro, methyl, ethyl or methoxy,

M$^\oplus$ is hydrogen or a non-chromophoric cation,

M is a non-chromophoric cation, and m' is 0 or 1,
 with the proviso that m' is 0 when $R'_1$ is

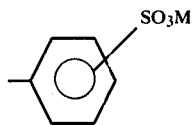

and is otherwise 1,
 with the proviso that the complex is free of

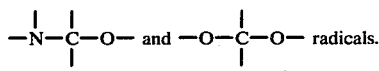

6. A homogeneous complex according to claim 5 having the formula

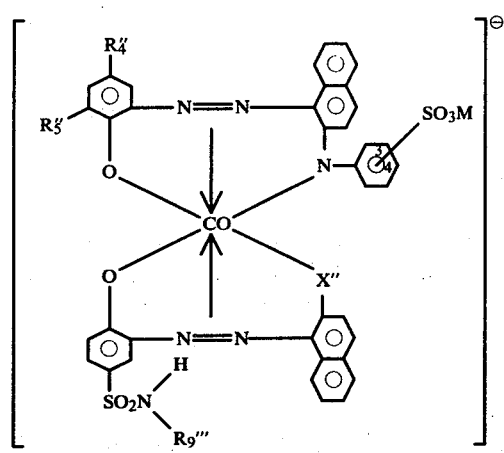

or a mixture of such complexes,
 wherein $R''_4$ is chloro or nitro,
 $R''_5$ is hydrogen, chloro or nitro,
 $R'''_9$ is hydrogen, methyl, 3-methoxypropyl or phenyl,
 —X"— is —O— or $-\overset{|}{N}-\underset{}{\bigcirc}$, $M^\oplus$ is hydrogen or a non-chromophoric cation, and
 M is a non-chromophoric cation,
 with the proviso that the —SO$_3$M group is in the 3- or 4-position.

7. A homogeneous complex according to claim 6, or a mixture of such complexes,
 wherein $R''_4$ is nitro, and
 $R''_5$ is nitro.

8. A homogeneous complex according to claim 7 having the formula

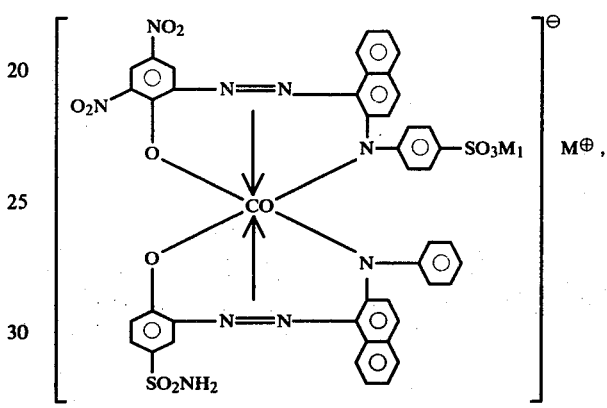

wherein $M^\oplus$ is hydrogen or a non-chromophoric cation, and $M_1$ is a non-chromophoric cation.

9. The homogeneous complex according to claim 8 wherein $M^\oplus$ is sodium, and
 $M_1$ is sodium.

10. A homogeneous complex according to claim 7 having the formula

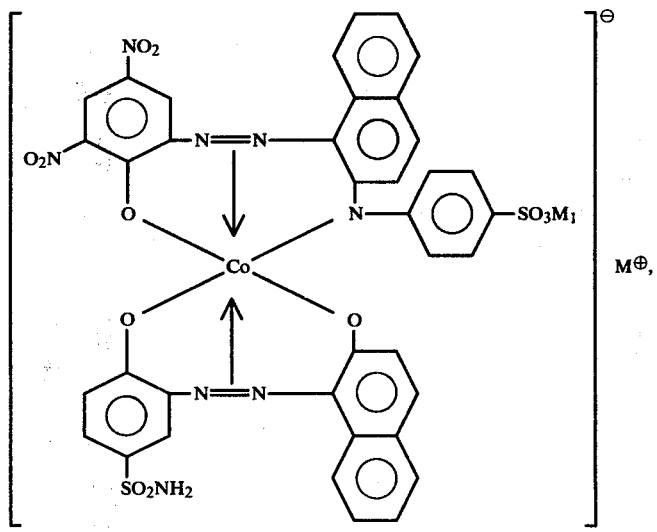

wherein $M^\oplus$ is hydrogen or a non-chromophoric cation, and
 $M_1$ is a non-chromophoric cation.

11. The homogeneous complex according to claim 10 wherein $M^\oplus$ is sodium, and $M_1$ is sodium.
12. A mixture of homogeneous complexes according to claim 7 having the formulae
wherein $M^\oplus$ is hydrogen or a non-chromophoroic cation, and
$M_1$ is a non-chromophoric cation.
13. A mixture of homogeneous complexes according to claim 7 having the formulae
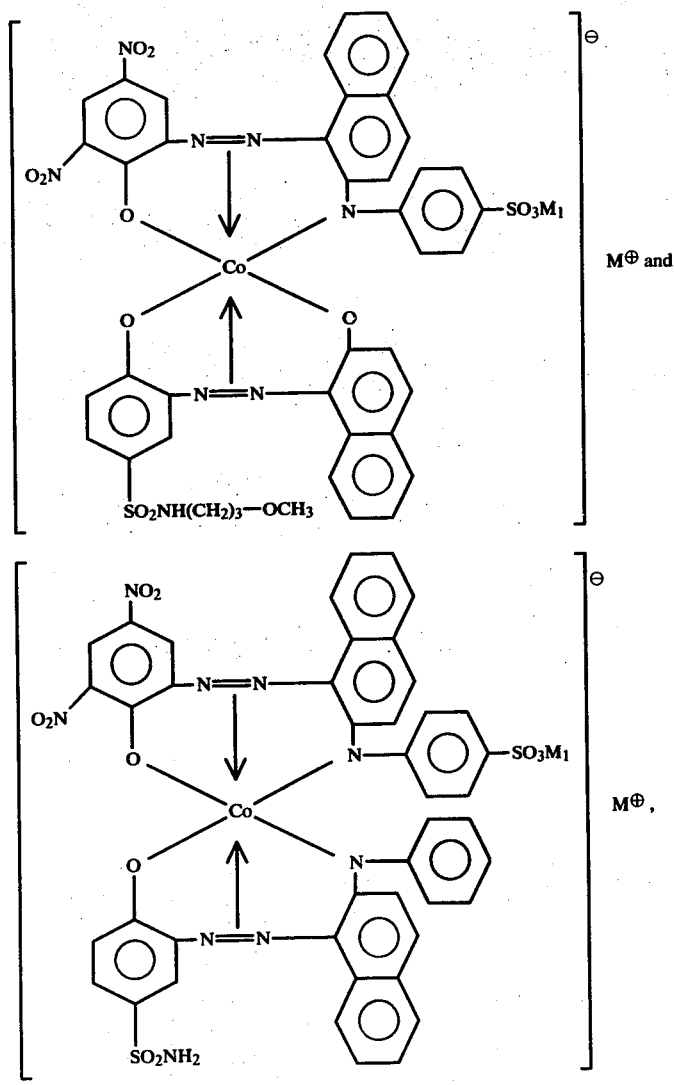

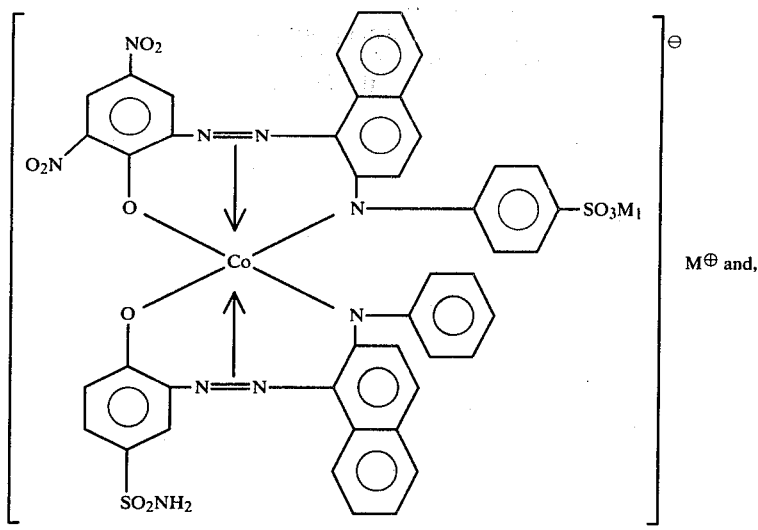
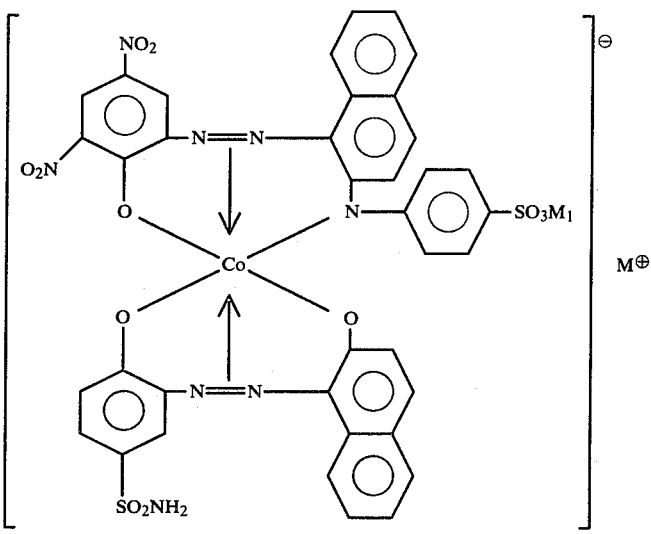
wherein M⊕ is hydrogen or a non-chromophoric cation, and
$M_1$ is a non-chromophoric cation.
14. A homogeneous complex according to claim 1 having the formula

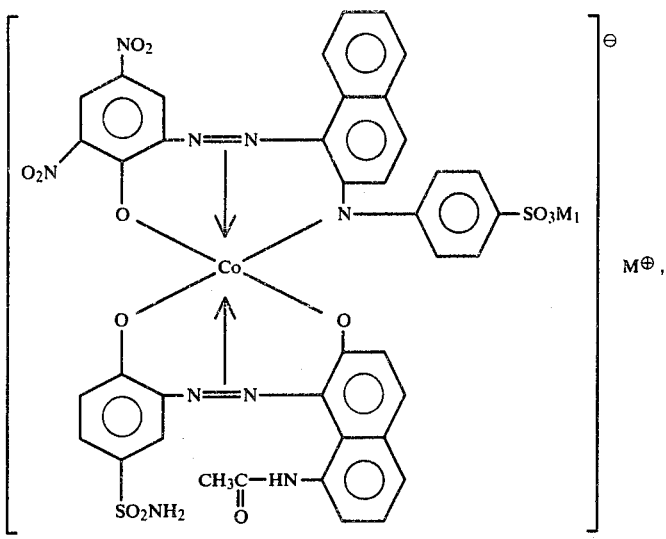

wherein M⊕ is hydrogen or a non-chromophoric cation, and
M₁ is a non-chromophoric cation.

15. The homogeneous complex according to claim 14 wherein M⊕ is sodium, and
M₁ is sodium.

16. A homogeneous complex according to claim 1 having the formula wherein M⊕ is hydrogen or a non-chromophoric cation, and
M₁ is a non-chromophoric cation.

17. The homogeneous complex according to claim 16 wherein M⊕ is sodium, and
M₁ is sodium.

18. A homogeneous complex according to claim 1 having the formula

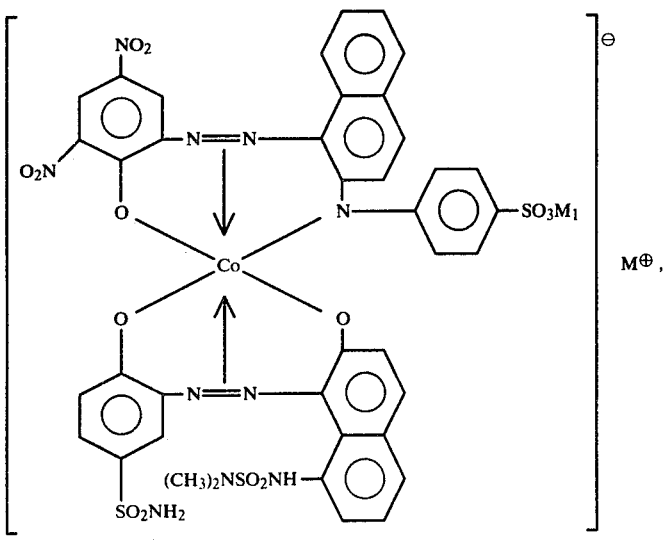

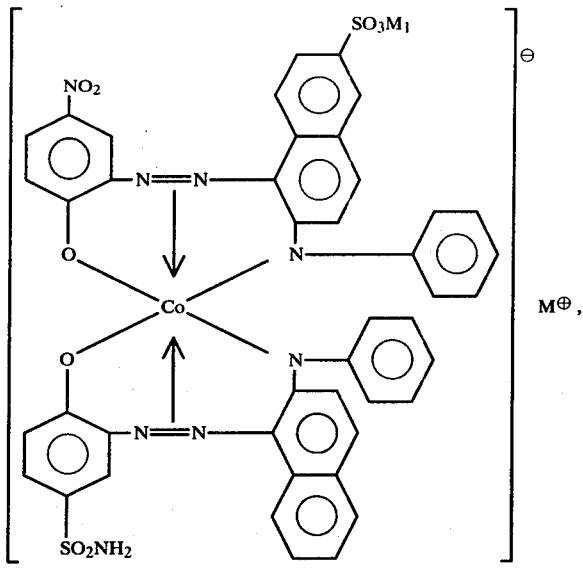

wherein M⊕ is hydrogen or a non-chromophoric cation, and
M₁ is a non-chromophoric cation.

19. A homogeneous complex according to claim 1 having the formula

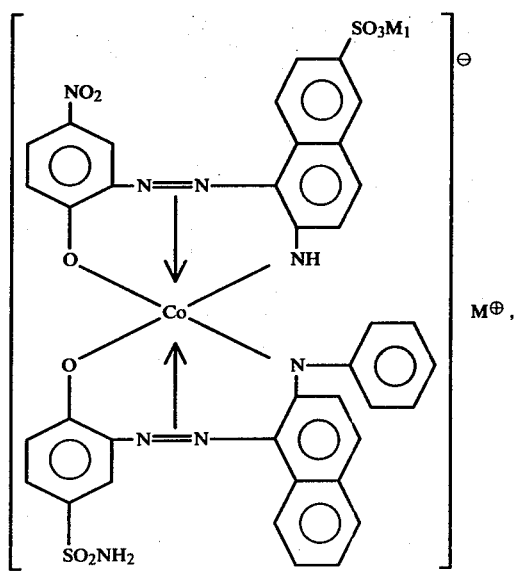

wherein M⊕ is hydrogen or a non-chromophoric cation, and
M₁ is a non-chromophoric cation.

20. The homogeneous complex according to claim 19 wherein M⊕ is sodium, and
M₁ is sodium.

21. The homogeneous complex according to claim 1 having the formula

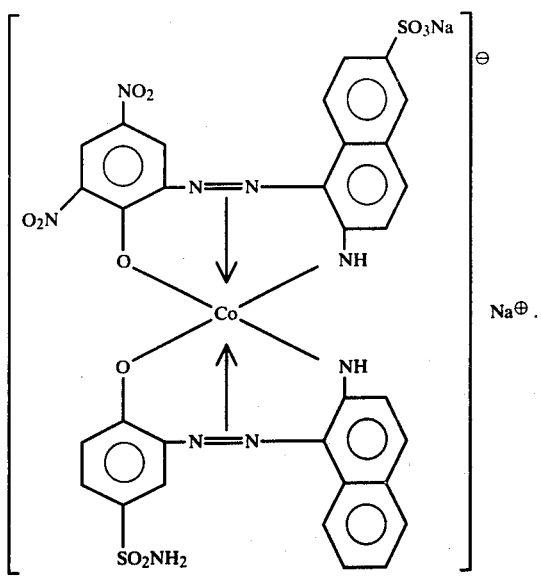
22. The homogeneous complex according to claim 1 having the formula
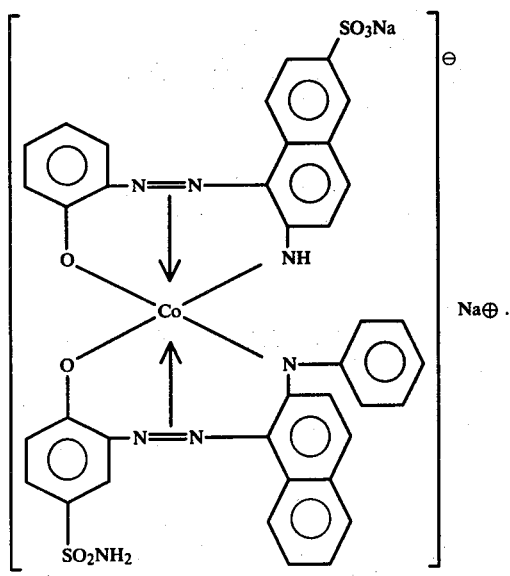
23. The homogeneous complex according to claim 1 having the formula 24. The homogeneous complex according to claim 1 having the formula
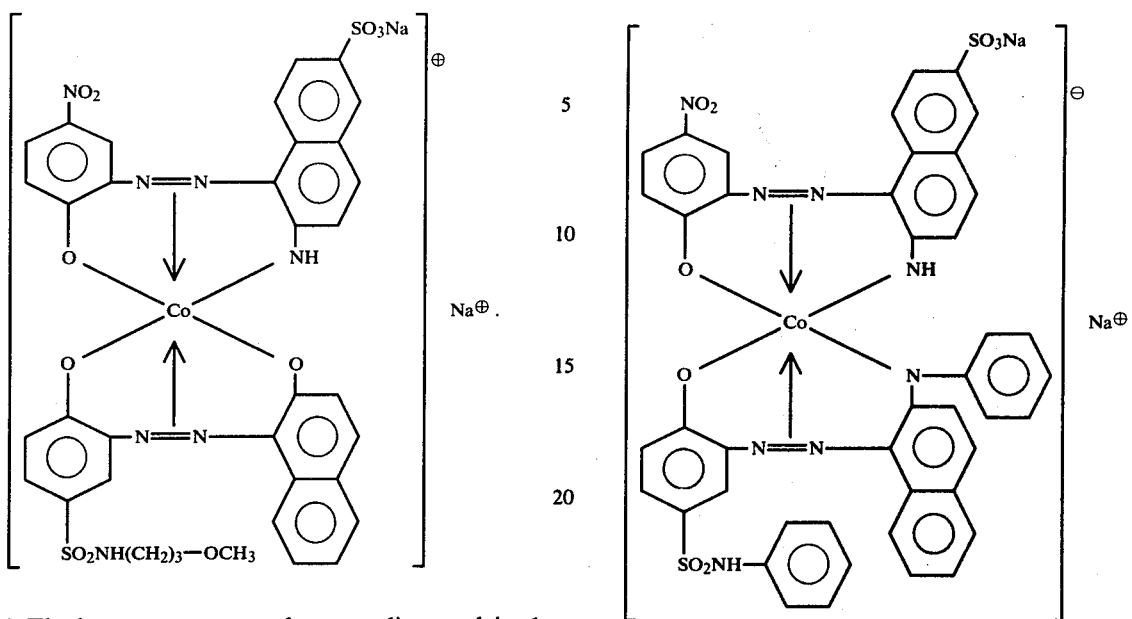
* * * * *

UNITED STATES PATENT AND TRADEMARK OFFICE
CERTIFICATE OF CORRECTION

PATENT NO. : 4,155,903
DATED : May 22, 1979
INVENTOR(S) : Jacky Dore

It is certified that error appears in the above-identified patent and that said Letters Patent are hereby corrected as shown below:

Column 15, line 31, "o" should read -- of --. Column 17, line 56, "M'" should read -- m' --. Column 18, line 6, "$C_{2-3}$hyroxyalkyl," should read -- $C_{2-3}$hydroxyalkyl, --. Column 19, line 40, "R"$_9$" should read -- R'''$_9$ --. Column 20, line 15, "a" should read -- A --.

Signed and Sealed this

Fifth Day of February 1980

[SEAL]

Attest:

SIDNEY A. DIAMOND

Attesting Officer     Commissioner of Patents and Trademarks